Aug. 10, 1965 S. L. LINDT ETAL 3,200,273
COIL ASSEMBLY ESPECIALLY SUITABLE FOR USE IN
DYNAMOELECTRIC MACHINES
Filed Nov. 1, 1962
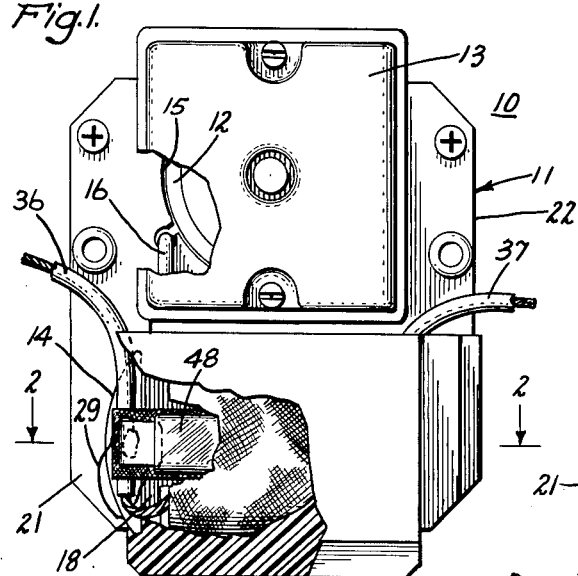
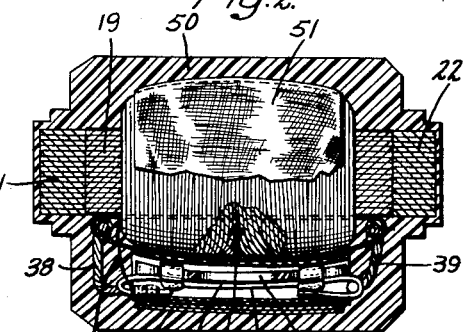
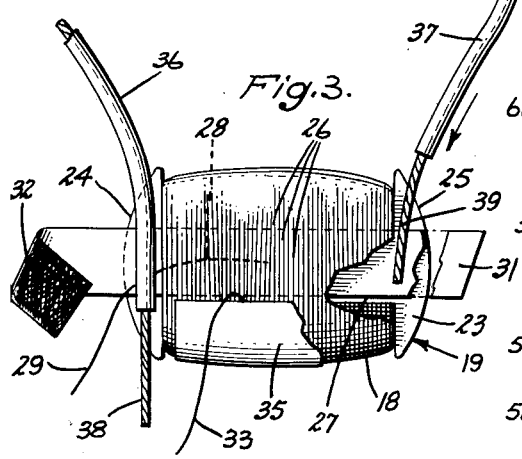
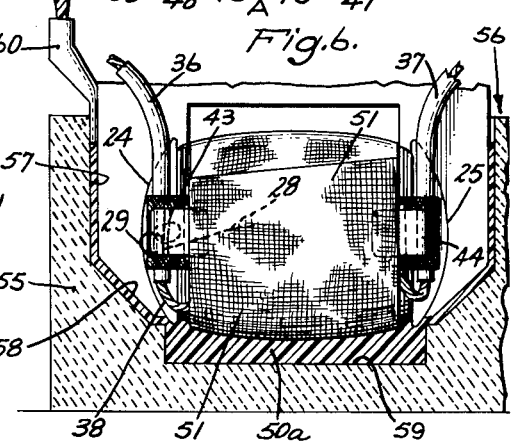
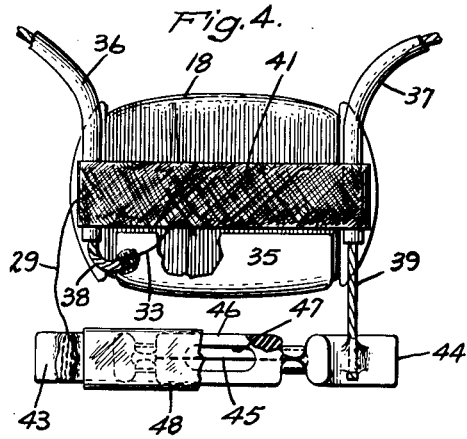
Inventors:
Stanley L. Lindt,
Clarence W. Woods, Jr.
by John M. Stoudt
Attorney.

United States Patent Office 3,200,273
Patented Aug. 10, 1965

3,200,273
COIL ASSEMBLY ESPECIALLY SUITABLE FOR USE IN DYNAMOELECTRIC MACHINES
Stanley L. Lindt and Clarence W. Woods, Jr., Fort Wayne, Ind., assignors to General Electric Company, a corporation of New York
Filed Nov. 1, 1962, Ser. No. 234,713
4 Claims. (Cl. 310—68)

The present invention relates in general to coil assemblies and dynamoelectric machines and more particularly to an improvement in small motors for use in applications where enclosed electrical components are desired.

In certain applications for small electric motors, it is desirable, if not necessary, that the electrical components, i.e., the windings and their connections, be enclosed from the surrounding atmosphere. For example, fractional horsepower motors are used today in many domestic refrigerators to drive air circulating fans, and both to protect the motor itself and to avoid hazard, it is necessary that the motor windings be effectively separated from the surrounding atmosphere. Considerable condensation of moisture occurs within the refrigerator and since the condensate may drip or otherwise come into contact with the motor, a waterproof casing should be provided for the windings to prevent shorting or grounding by the condensate. Also, since any electrical winding is liable to failure over an extended period of time, refrigerators being used upwards of fifteen to twenty years, the motor windings should be encased to prevent the escape of molten copper if failure should occur after years of service. Obviously, if molten copper could escape into the refrigerator, a considerable fire and personal hazard would be created. The same considerations hold true for any flames or sparks occurring upon motor failure, which should also be prevented from escaping into the surrounding environment.

A traditional approach generally followed by fractional horsepower motor manufacturers for these applications where the electrical components of the motor must be separated from the surrounding atmosphere is to encase the motor completely with a metal enclosure. In other words, the motor housing surrounds the rotor and the stator with no openings whatsoever except for the output shaft. These motors are known as totally enclosed motors and they do result in acceptable protection of the windings and elimination of hazard upon winding failure. But they are quite expensive as compared to an open motor and in addition they have several inherent disadvantages. Their size and bulk is increased as compared to an open motor, which sometimes makes them more difficult to use where space is at a premium. Also, and probably most important, the normal ventilation system for open motors wherein the heat generated in the windings is dissipated to a stream of air passed through the motor cannot be used. With the lack of adequate ventilation, the motor temperature necessarily rises and consequently the life of the winding insulation is adversely effected. Also, the lubrication properties of the oil supplied to the shaft bearings are reduced due to the higher temperature of operation.

A recent innovation, tending to overcome the shortcomings of the traditional approach, is the one in which, among other things, only the windings are enclosed in an imperforate covering, such as that disclosed and claimed in the U.S. patent application of Hugo C. Kaeding, Serial No. 58,954, filed September 28, 1960 and assigned to the same assignee as the present invention. The instant invention is related to this latter approach.

Accordingly, it is a general object of our invention to provide an improved coil or winding assembly for use in an application where enclosed electrical components are desired, wherein only the windings are enclosed as contrasted to the entire electrical inductive device.

It is a more specific object of our invention to provide an improved dynamoelectric machine stator having windings effectively protected from moisture and from the escape of molten copper and flame upon failure, and having a self-contained dynamoelectric machine protection arrangement without increasing the size or bulk of the machine unnecessarily.

A further specific object of our invention is to provide an improved motor for use in applications requiring enclosed electrical components, which is not only less expensive to manufacture than a totally enclosed motor of equivalent output, but also insures a fail-safe type of motor.

It is a further object of our invention to provide a motor stator capable of assembly which does not require skilled personnel to practice, yet results in an improved motor structure.

Briefly stated, in accordance with one form of our invention which now forms the subject matter of and is claimed in our divisional application entitled "Method of Manufacturing an Electric Coil Assembly" filed March 30, 1965, we provide an improved method of manufacturing an electric motor stator for service where enclosed electrical components are desired, in which a winding formed of a number of turns of metallic wire having an adherent coating of insulating material, is provided on the stator core. A pair of insulated lead conductors adapted to be connected to a power source, each having a stripped end, are held adjacent the winding, one on either side thereof, with one of the stripped ends being electrically joined to one side of a fusible assembly which overlies the winding and is in series circuit with the wing through its other side. This other side is, in turn, attached to one end of the winding. The opposite winding termination is electrically joined to the stripped end of the second lead conductor to complete the winding circuit. Preferably the fusible assembly includes an air pocket surrounding a fusible part of the assembly for receiving the fusible part upon failure thereof and has an adhesive insulating strip enclosing the pocket as well as providing means for insulating the electrical connections of the assembly from the winding itself, the connections being bent back over the strip. In addition, the electrical connections are all in spaced relation with reference to one another to minimize any short circuiting possibility.

A sheet of heat-resistant material having small recesses is wrapped around the winding and fusible assembly, with the recesses facing away from the winding. An imperforate protective covering is then formed, as by molding, in intimate contact with the sheet and exposed peripheral winding surfaces, such that the winding, fusible assembly, and sheet are encompassed and the two lead conductors project through and beyond the covering for connection to a suitable power source.

With respect to our improved coil or winding assembly, which forms the subject matter claimed in the present specification, the motor stator incorporates a self-contained completely reliable yet inexpensive "fail-safe" motor protection arrangement which is capable of satisfactory use with any one of a variety of windings; e.g., random or precision wound. This arrangement has the various electrical connections in isolated relation, and if a failure occurs at all, provides accurate and controlled winding failure while effectively containing the products of failure that is the escape of molten material and any accompanying sparks and flames. The insulating coating on the wire, the fusible part of the assembly, and the outer perforate covering, are so interrelated that initial deterioration in the winding wire coating will serve to accelerate failure of the fusible assembly by creating a surge in the winding circuit of sufficient magnitude to destroy the fusible part before the outer covering reaches its melting temperature.

The motor may thus be employed in applications requiring entirely reliable fail-safe electrical components without utilizing a housing for the motor. During nominal operating conditions of the motor, the imperforate outer covering for the winding not only aids in avoiding winding failure in the first instance but is also effective to prevent the entrance of the moisture into the winding itself.

The subject matter which we regard as our invention is particularly pointed out and distinctly claimed in the concluding portion of this specification. Our invention, however, both as to organization and method of operation, together with further objects and advantages thereof, may be best understood by reference to the following description taken in conjunction with the accompanying drawing in which:

FIG. 1 is an elevational view of a small electric motor which embodies our invention in one form thereof, the view being partially broken away to show details;

FIG. 2 is a cross-sectional view taken along the line 2—2 of FIG. 1 and illustrates the motor protection system of the present invention in one form;

FIG. 3 is an elevational view of the coil supporting core showing the placement of external leads on either side of the winding subsequent to the winding operation;

FIG. 4 is a view similar to that of FIG. 3 illustrating the connection of the external leads to the winding;

FIG. 5 is a similar view to FIG. 4 illustrating the component parts of the coil support core in position preparatory to the formation of an imperforate outer covering encompassing the winding; and FIG. 6 is an elevational view, partly in section, of the motor with the core and winding in place shown as the outer covering is being applied to the winding.

Referring now to the drawing, and in particular to FIGS. 1 and 2, we have shown therein an electric motor 10 which embodies our invention in one form thereof. The motor 10 is of the shaded pole type and it includes a stator 11 and a rotor 12. The rotor 12 is suitably supported for relative rotation with stator 11 by a pair of bearing assemblies 13 (one shown in FIG. 1) which are secured to the stator. A pair of oppositely disposed pole faces provided on the stator, one of the pole faces being shown at 15, form a rotor receiving bore wherein the rotor is activated during operation by means of the magnetic flux passing between these pole faces. Suitable shading coils are provided at the trailing ends of the stator pole faces to provide starting torque and to aid in producing running torque. For example, the shading coils for the pole face 15 may comprise a pair of copper rings such as are indicated at 16 and it will be understood that similar coils are mounted diametrically opposite on the other pole face.

The magnetic flux for exciting the rotor 12 is provided by an electrical winding or coil 18 which is mounted on a core section or winding leg 19 of the stator. Winding leg 19 bridges and is in tight engagement with depending legs 21 and 22 of the stator yoke section and serve to complete the flux path between the winding legs and the pole faces.

As is best seen in FIG. 2, both winding leg section 19 and the main portion of the stator are formed of a plurality of stacked laminations of magnetic material. The winding leg 19 is furnished separately from the rest of the stator and is pressed into position between the legs 21 and 22 after the coil 18 has been wound thereon. The press fit between the winding leg 19 and the depending legs 21 and 22 is sufficient in itself to keep winding leg 19 in place with no additional securement being required.

It will be understood that the rotor 12 may also be formed of a plurality of stacked laminations of magnetic material with a squirrel cage winding of conductive material being provided in slots formed therein in the usual manner.

Before describing further details of motor 10 and the preferred arrangement by which we make the motor both fail-safe and moisture proof, we will outline one method for assembling and enclosing the electrical components of motor 10. Referring to FIG. 3, winding leg 19 is illustrated after an electrical insulating layer 23 has been hardened on its outer faces, with the exception of the arcuate surfaces 24, 25 which are adapted to engage complementary edges at depending legs 21, 22. Preparatory to the winding operation in which coil forming wire 26 is deposited in successive turns around axial section 27 of leg 19, either in random or precision wound fashion thereon by a conventional coil winding machine (not shown), a start wire end 28 is initially placed along the central axial section 27, with wire extremity 29 projecting beyond arcuate surface 24 of the leg. A piece of insulating tape 31 having an adhesive side 32 is then positioned over wire length 26 such that adhesive side 32 faces section 28 to retain the wire length on the section during the winding operation. Upon completion of the coil forming operation, the wire running to the coil winding machine is severed and a short strip of suitable adhesive insulating strip 35 is preferably disposed on top of coil 18 over the severed finish wire end 33 to hold end 33 temporarily in place for subsequent fabricating procedures.

External insulated lead conductors 36, 37 for connecting coil 18 to a suitable power source, such as an alternating current energizing source, are arranged at opposite sides of the coil so that bare lead terminations or stripped ends 38, 39 lie beyond the edge of tape 31. The ends of tape 31 are then brought tightly about the leads until the tape ends overlap to permit them to be firmly pasted together, denoted at 41, with the tape encircling the leads and one winding side of the coil and leads in the manner revealed in FIG. 4 for holding the leads in place. It will be observed in FIG. 4 that as illustrated, adhesive surface 32 of tape 31 is disposed away from the peripheral surface of the coil.

Referring now more specifically to FIG. 4, we have shown the preferred way in which we connect coil 18 to leads 36, 37. Lead termination 38 of lead 36 is soldered or otherwise electrically joined to finish wire end 33 while the other lead 37 is attached to start wire end 29 through the intermediary of a series connected fusible assembly 42. In the illustrated form, assembly 42 comprises a pair of separated electrically conducting extensions 43, 44 and a fusible wire portion 45 suitably mounted on insulator 46, overlying insulator opening 47, linking the extensions together. Electrically joined, as at soldered connection 38, to extension 43 is start coil wire end 29; lead termination 39 is similarly connected to extension 44. A rectangular sheet of adhesive insulation 48 in tape form, similar in composition to tape 31 and dimensionally longer than the length of wire 45, is wrapped around fusible wire 45 and insulator 46 and, together with insulator opening 47, provides an air pocket to receive the flow of material when wire 45 melts or flashes under adverse operating conditions, to be further explained below. Each end of extensions 43, 44 carrying the electrical joint with wires 29 and 39 respectively is folded back over insulation 48, and in the manner shown by FIG. 5 assembly 42 is pressed onto adhesive tape surface 32, which holds the assembly in position adjacent the outer surface of the coil.

Preparatory to the formation of an impervious outer covering 50 for enveloping coil 18 in a manner to be subsequently explained, we prefer to wrap a sheet of heat resistant material tightly around coil 18 and fusible assembly 42. The sheet is identified by numeral 51 in FIG. 6, formed by way of exemplification of glass fibers to provide a latticed or rough appearance on one side and an adhesive surface provided on the other, with the rough surface facing outwardly in overlapping end to end relation. Material 51 assists in retaining bent extensions 43, 44 firmly against insulation strip 48 thereby minimizing any chance of their displacement when the coil supporting core is pressed into proper position between stator legs 21, 22, the final assembly step prior to the provision of imperforate coverings 50. In addition, the latticed surface of the material furnishes a matrix of small recesses for implementing the formation of the imperforate outer covering 50, to be described hereinafter in connection with the molding operation illustrated in FIG. 6.

It will be appreciated from the procedure described so far that the coil and core assembly, before it is inserted between stator legs 21, 22, is readily fabricated by simple and inexpensive steps capable of being performed by unskilled personnel. These steps insure the electrical isolation of leads 36, 37 from each other as well as from coil 18 to prevent possible short circuiting which might otherwise occur during the fabrication procedure. Moreover, the components of the coil and core assembly are retained in their relative finally assembled positions and may be transferred as a unit from one work station to another or may be conveniently stored until needed, adding flexibility to the manufacturing process without incurring additional expense by requiring the use of temporary holding equipment such as clamps and the like.

In accordance with the succeeding stage of the process, inperforate covering 50 is formed over sheet 51 to encase or totally enclose coil 18, the lead connections, and fusible assembly 42. This is achieved in the exemplification by a molding operation in which the molding apparatus includes a mold 55 having a cavity 56 open at the top which preferably has the configuration exhibited in FIG. 6 when employed in connection with the manufacture of the electric motor of the illustrated embodiment. Cavity 56 is formed by vertical side walls 57 and downwardly tapered walls 58 for supporting the legs of the motor and its core and coil assembly in spaced relation with the bottom cavity wall 59. With the motor placed upright in the cavity, we preferably insert a thermosetting resin 50a in an unhardened state, such as uncured epoxy resin XR50508 commercially available from Minnesota Mining and Manufacturing Company, through nozzle 60 into cavity 56, the plastic resin flowing over the exposed surfaces of sheet 51, fusible assembly 42, lead terminations 38, 39 and coil 18.

This resin should be compatible with insulating layer 23 disposed on the core and with the insulation of the leads so that resin 50a will adhere to the layer and leads to form, upon curing, a water tight bond therewith, effective to prevent water from leaking into the coil. In addition, the constituents of the insulations must be such that they will not adversely affect covering 50 over a long period of time. It should be noted at this time that with a lead disposed on either side of coil 18 in the fashion illustrated, an unusually large contacting area is provided between the lead outer surfaces and resin 50a to insure an adequate bond therebetween even though covering 50 may be thin in cross section area.

The resin is then cured in place, by the application of heat such as passing the mold and motor through an oven, so as to form a uniform imperforate or substantially void free covering 50 in intimate bonding contact with the core components just named. The rough surface provided by the recesses of sheet 51 will assist in providing this intimate bonding contact for the covering. Upon hardening of the resin, the motor may be conveniently removed from the mold cavity, and if desired, dipped in varnish to deposit a layer of varnish over the covering 50 to assist in keeping moisture out of the coil when the motor is used under extreme conditions; e.g., the coil being submerged in water.

Turning now to further aspects and additional advantages of the present invention, we are able to insure the fail-safe and explosion free feature not only by producing the motor as previously described, but also by interrelating the insulation coating on the coil wire, fusible assembly 42, and the outer protective covering 50. Specifically, the coil wire is preferably of the type known in the motor industry as "magnet wire" having an outer insulation coating with a predictable melting or failure point in terms of temperature. In actual practice we have satisfactorily utilized Nyleze, a moisture resistant wire produced by the Phelps Dodge Copper Products Corporation which has a polyurethane inner coating and a nylon outer coating to provide the wire with insulation of a predictable melting point between 165° C. and 225° C.

Under normal operating conditions, the hottest part of the coil is located within the coil, approximately one-fourth of the linear distance from the outer surface of the coil toward the magnetic core denoted at A in FIG. 2. In a motor of the type shown, the temperature differential is normally 60° C. Therefore, if a small ground or short occurs within the wire, the wire insulation will initially deteriorate or melt in the vicinity of A. Initial deterioration will increase the temperature in that location, producing a slight arcing to facilitate shorting of the winding wire, which in turn, causes a sharp and instantaneous rise or surge in the current drawn through leads 36, 37 and the winding of sufficient magnitude to destroy the fusible link. During this short period of failure, there will be an inherent thermal time delay in the heating at cover 50; i.e., its temperature rise lags behind that internally of the coil.

Consequently, by positioning fusible assembly 42 adjacent the outer surface of the coil, preferably overlying the winding surface which is not immediately affected by an over-temperature condition within the coil and further protecting fusible link 45 by tape 48, a link may be chosen which is sensitive to the current surge rather than the internal failing or hot spot temperature, as such, permitting ease of assembly onto the winding. Moreover the exact value at which the fuse is destroyed is not critical. For instance, with the use of Nyleze wire, the fuse may be destroyed by a current surge in the range of from one to about fifteen amperes. The pocket surrounding the link will act to contain the gases and other by-products as the link is being destroyed so that, even through assembly 42 is disposed next to cover 50, the cover will not be ruptured by internal winding pressures and may be formed with a minimum cross section or thickness over the coil as little as $\frac{1}{32}$ of an inch (exaggerated in the drawing for purposes of clarity) effecting a savings of material used.

In addition, covering 50 may utilize a material having a relatively low deterioration temperature and still avoid failure upon an over-heated condition in the winding. The thermosetting epoxy 50a previously listed by way of example for the covering 50 starts break-down at a temperature in the order of 180° C. without melting or otherwise failing upon the over-heated winding condition, permitting the use of a less expensive yet entirely satisfactory material than has been heretofore possible. Thus, the advantages and features set forth above regarding the preferred form of our invention, provide an improved motor stator which is less expensive to manufacture than a totally enclosed motor construction of equivalent rating.

It will be appreciated that there are many modifications and various applications of the coil assembly structure according to the instant invention. In accordance with the patent statutes, we have described what at present is considered to be the preferred embodiment of our invention. However, it will be obvious to those skilled in the art that various changes and modifications may be made in the disclosed structure without departing from our invention, and it is, therefore, aimed in the appended claims to cover all such changes and modifications as fall within the true spirit and scope of our invention.

What we claim as new and desire to secure by Letters Patent of the United States is:

1. An electric coil assembly for service where enclosed electric components are desired, comprising a magnetic core, a coil formed of a number of turns of metallic wire having an adherent coating of insulating material mounted on said core and insulated therefrom, fusible means electrically connected to one end of the wire, a pair of insulated lead conductors with one of the conductors being electrically conected to the other wire end of said coil and the second conductor electrically joined to the other wire end, said fusible means being insulated from the coil and the three electrical connections being in spaced relation with one another and with said coil, and an imperforate covering of protective material formed directly over and bonded to the outer surface to enclose completely said coil, fusible means, and electrical connections, said covering being effective to resist melting at internal hot spot winding temperatures high enough to initiate deterioration of said wire coating which in turn causes surges in the winding current to break said fusible means for disconnecting the winding from the power source whereby in the event of initial deterioration of said wire coating and the resulting breaking of said fusible means, said fusible means is contained within said covering and a complete failure of the machine occurs before said covering is affected thereby insuring a fail-safe winding arrangement.

2. An electric coil assembly for service where enclosed electric components are desired, comprising a magnetic core, an excitation coil mounted on said core and insulated therefrom, said coil being formed of a number of turns of metallic wire having an adherent coating of insulating material; a pair of insulated lead conductors maintaining the stripped conductor ends near but spaced from the periphery of said winding, with one of the conductor stripped ends being electrically connected to one wire end of said winding; fusible means electrically connected in series circuit between the other conductor and the other wire end, and arranged adjacent said winding periphery, said fusible means being insulated from the winding and being surrounded by an enclosed air pocket for receiving and containing said means in the event that it is destroyed; and an imperforate covering of protective material formed directly over said winding and bonded to said core to enclose completely said coil and fusible means, said covering being effective to resist melting at internal hot spot winding temperatures high enough to initiate deterioration of said wire coating which in turn creates surges in coil current to destroy said fusible means for opening the coil circuit whereby in the event of initial deterioration of said wire coating and resulting destruction of said fusible means, the enclosed air pocket will contain the by-products of said fusible means and a complete failure of the coil assembly will occur before said covering is affected thereby insuring a fail-safe explosion proof coil arrangement.

3. A dynamoelectric machine stator for service where enclosed electric components are desired, comprising a stator core, said core having a layer of insulation formed directly thereon, an excitation winding mounted on said core over said insulation, said winding being formed of a number of turns of metallic wire having an adherent coating of insulating material; a pair of insulated lead conductors connectible to a power source each having a stripped end; means maintaining the stripped conductor ends near but spaced from the periphery of said winding, with one of the conductor stripped ends being electrically connected to one wire end of said winding; fusible means electrically connected in series circuit between the other conductor stripped end and the other wire end, and arranged adjacent and overlying said winding periphery, said fusible means having insulation surrounding it to form an enclosed air pocket for receiving said means in the event that it is destroyed; said insulation also insulating said fusible means from said winding, and an imperforate covering of protective resinous material formed directly over said winding and bonded to said layer of resinous insulation to enclose said coil and fusible means completely, said covering being effective to resist melting at internal hot spot winding temperatures high enough to initiate deterioration of said wire coating which in turn causes surges in winding current to destroy said fusible means for disconnecting the winding from the power source whereby in the event of initial deterioration of said wire coating and the resulting destruction of said fusible means, said enclosed air pocket will contain the gases and melted material created as said fusible means is being destroyed and a complete failure of the machine will occur before said covering is adversely affected thereby insuring a fail-safe explosion and moisture proof winding arrangement.

4. A dynamoelectric machine stator for service where enclosed electric components are desired, comprising a magnetic core, an excitation winding mounted on said core and insulated therefrom, said winding being formed of a number of turns of metallic wire having an adherent coating of insulating material with a predictable melting point; a pair of insulated lead conductors disposed on either side of and adjacent said winding; one of said lead conductors electrically connected to one end of said metallic wire of said winding; fusible means connected in series circuit between the other wire end and the other lead conductor, said fusible means overlying a part of the outer surface of said winding and being insulated therefrom, said fusible means comprising a piece of longitudinally extending insulation having an opening therein and a fusible link extending over said opening, adhesive insulating tape wrapped around both said insulating piece and said fusible link to form an enclosed air pocket surrounding a part of the link for containing link in the event it is destroyed, a sheet of heat-resistant material wrapped over the fusible means and around the periphery of the coil for assisting in retaining said fusible means stationary on said coil; and an imperforate covering of protective resinous material formed directly over and bonded to said winding, fusible means, and sheet, said covering being effective to resist melting at internal hot spot winding temperatures high enough to initate deterioration of said wire coating which in turn causes surges in winding current to destroy said fusible means for opening the winding circuit whereby in the event of initial deterioration of said wire coating and the resulting destruction of said fusible means, said enclosed air pocket will contain the gases and melting material created as said fusible means is being destroyed and a complete failure of the machine will occur before said covering is adversely affected thereby insuring a fail-safe explosion and moisture proof winding arrangement.

References Cited by the Examiner

UNITED STATES PATENTS

| | | | |
|---|---|---|---|
| 3,083,309 | 3/63 | Brown et al. | 310—68 |
| 3,084,418 | 4/63 | Procopio | 29—155.5 |
| 3,103,737 | 9/63 | Elsworth | 29—155.5 |
| 3,131,322 | 4/64 | Pleiss et al. | 310—68 |

ORIS L. RADER, *Primary Examiner.*

MILTON O. HIRSHFIELD, *Examiner.*